United States Patent
Dodt et al.

(10) Patent No.: US 7,316,352 B1
(45) Date of Patent: Jan. 8, 2008

(54) SYSTEM AND METHOD FOR LOCKED CODE ON A RADIO FREQUENCY IDENTIFICATION TAG

(75) Inventors: William Carl Dodt, Broomfield, CO (US); Zengqi Yu, Fort Collins, CO (US)

(73) Assignee: Storage Technology Corporation, Louisville, CO (US)

( * ) Notice: Subject to any disclaimer, the term of this patent is extended or adjusted under 35 U.S.C. 154(b) by 285 days.

(21) Appl. No.: 11/021,216

(22) Filed: Dec. 23, 2004

(51) Int. Cl.
*G06K 7/08* (2006.01)

(52) U.S. Cl. .................. 235/451; 235/380; 235/492; 340/531

(58) Field of Classification Search .............. 235/492, 235/451; 340/531, 572.1, 572.7
See application file for complete search history.

(56) References Cited

U.S. PATENT DOCUMENTS

| | | | |
|---|---|---|---|
| 5,302,947 A * | 4/1994 | Fuller et al. ............... 340/5.42 |
| 5,887,176 A * | 3/1999 | Griffith et al. ............. 713/320 |
| 5,949,335 A | 9/1999 | Maynard |
| 6,154,137 A | 11/2000 | Goff et al. |
| 6,317,028 B1 | 11/2001 | Valiulis |
| 6,778,096 B1 * | 8/2004 | Ward et al. ................ 713/1 |
| 7,026,935 B2 * | 4/2006 | Diorio et al. ............. 340/572.2 |
| 2002/0093426 A1 | 7/2002 | Jackson et al. |
| 2003/0169149 A1 | 9/2003 | Ohki et al. |
| 2004/0065733 A1 | 4/2004 | Fukuoka |
| 2004/0085191 A1 | 5/2004 | Horwitz et al. |
| 2004/0089717 A1 | 5/2004 | Harari et al. |
| 2004/0189625 A1 | 9/2004 | Sato |
| 2004/0222878 A1 | 11/2004 | Juels |
| 2005/0120260 A1 * | 6/2005 | Suzuki et al. ............... 714/5 |
| 2005/0125745 A1 * | 6/2005 | Engestrom et al. ......... 715/847 |
| 2005/0139664 A1 * | 6/2005 | Yamagiwa ................. 235/385 |
| 2006/0065730 A1 * | 3/2006 | Quan et al. ................ 235/451 |
| 2006/0071793 A1 * | 4/2006 | Pesavento ................ 340/572.1 |
| 2006/0133175 A1 * | 6/2006 | Gutnik et al. ............ 365/225.7 |
| 2006/0181414 A1 * | 8/2006 | Bandy et al. ........... 340/539.22 |
| 2006/0226213 A1 * | 10/2006 | Ashili et al. ............... 235/375 |

* cited by examiner

*Primary Examiner*—Steven S. Paik
(74) *Attorney, Agent, or Firm*—Brooks Kushman P.C.

(57) ABSTRACT

A radio frequency identification (RFID) tag system includes a coupler/controller subsystem and a memory. The coupler/controller subsystem wirelessly receives and transmits at least one user signal and at least one master signal. The memory is electrically coupled to the coupler/controller subsystem. The memory includes a user portion for storing information contained in the at least one user signal and a master portion for storing information contained in the at least one master signal, and the master portion of the memory is unalterable by a user.

16 Claims, 2 Drawing Sheets

SYSTEM AND METHOD FOR LOCKED CODE ON A RADIO FREQUENCY IDENTIFICATION TAG

BACKGROUND OF THE INVENTION

1. Field of the Invention

The present invention relates to a system and a method for locked code on a radio frequency identification (RFID) tag.

2. Background Art

Radio frequency identification (RFID) and data storage protocols are designed into a number of other products including data storage tape drives and media cartridges. For data storage applications, an RFID "tag" which is typically implemented as a transponder and non-volatile memory is included in each media cartridge. The RFID tag provides for assignment of unique identification information to individual cartridges and the information is typically stored in the respective media. The RFID tags are wirelessly (e.g., electromagnetically, electrostatically, etc.) read from and written to by a read/write device. The read/write device can be implemented in connection with at least one of a tape (or media) transport (or drive) and a media library robotic retrieval arm assembly.

Conventional RFID approaches typically implement coding (i.e., data, information, etc.) as information content in a comprehensive tag memory. The comprehensive tag memory typically includes accessible portions such as a general read page, a selective read page, a selective read page and a program page, as well as software locked pages. A number of conventional software locking approaches have been used to attempt to protect secure information on the conventional RFID tag. However, such conventional software based approaches have a deficiency in that countermeasures to the software lock (e.g., hacking, and other unauthorized intrusion) are challenging the security of information stored in the conventional RFID tag.

Thus there exists an opportunity and need for an improved system and method for improving the security of RFID tags, thereby obviating or reducing deficiencies of conventional approaches.

SUMMARY OF THE INVENTION

The present invention generally provides a system and a method for new, improved and innovative techniques for improving the security of radio frequency identification (RFID) tags.

According to the present invention, a radio frequency identification (RFID) tag system is provided. The system comprises a coupler/controller subsystem and a memory. The coupler/controller subsystem wirelessly receives and transmits at least one user signal and at least one master signal. The memory is electrically coupled to the coupler/controller subsystem. The memory comprises a user portion for storing information contained in the at least one user signal and a master portion for storing information contained in the at least one master signal, and the master portion of the memory is unalterable by a user.

Also according to the present invention, a method for securing at least a portion of data on a radio frequency identification (RFID) tag is provided. The method comprises wirelessly receiving and transmitting at least one user signal and at least one master signal using a coupler/controller subsystem, and storing information contained in the at least one user signal in a user portion of a memory that is electrically coupled to the coupler/controller subsystem, and storing information contained the at least one master signal in a master portion of the memory. The master portion of the memory is unalterable by a user.

Further, according to the present invention, a radio frequency identification (RFID) tag system is provided. The system comprises a coupler/controller subsystem and a memory. The coupler/controller subsystem wirelessly receives and transmits at least one user signal and at least one master signal. The coupler/controller subsystem comprises a user controller, a user coupler, and a user antenna that are electrically coupled and tuned to a user frequency that is used to wirelessly transmit and receive the at least one user signal and wirelessly transmit the at least one master signal, and a master controller, a master coupler, and a master antenna that are electrically coupled and tuned to a master frequency that is used to wirelessly transmit and receive the at least one master signal and wirelessly transmit the at least one user signal. The master frequency is different from the user frequency. The memory is electrically coupled to the coupler/controller subsystem. The memory comprises a user portion for storing information contained in the at least one user signal and a master portion for storing information contained in the at least one master signal. The master portion of the memory is unalterable by a user.

The above features, and other features and advantages of the present invention are readily apparent from the following detailed descriptions thereof when taken in connection with the accompanying drawings.

DETAILED DESCRIPTION OF THE PREFERRED EMBODIMENT(S)

Figure 1:
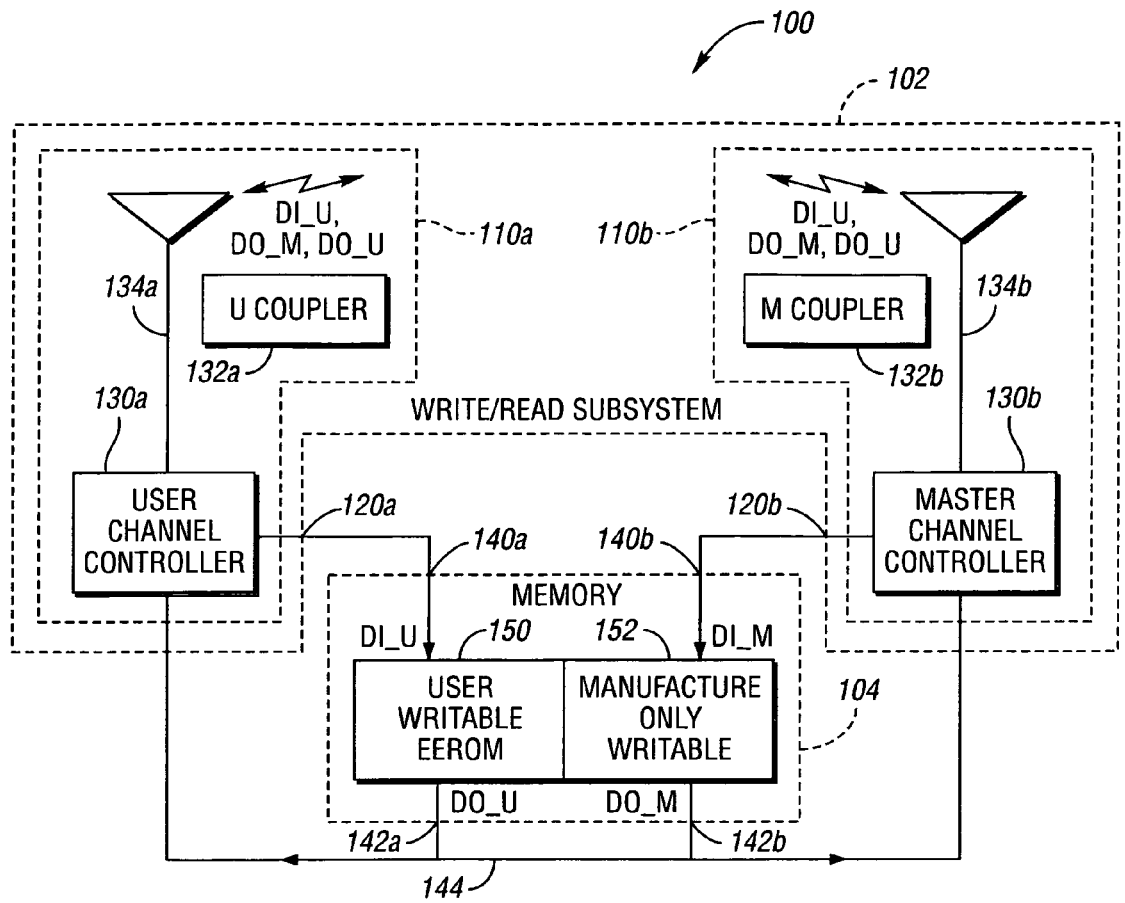
FIG. 1 is a diagram of an example of a radio frequency identification (RFID) tag system of the present invention.

With reference to the Figures, the preferred embodiments of the present invention will now be described in detail. Generally, the present invention provides an improved system and method for new and innovative techniques for improving the security of radio frequency identification (RFID) tags. The present invention generally provides a hardware based protection of secure information in the RFID tag at hardware level. The present invention generally provides a system and a method for locked (i.e., secure) code (i.e., data, information, etc.) on a RFID tag. The present invention generally provides for manufacturer writing the secure information into the RFID tag using the read/write system in the factory. In one example, the system and method of the present invention may be used alone. In another example, the system and method of the present invention may be used in connection with a software lock program.

In one example, the present invention generally implements a locked code (e.g., a manufacture code that is generally accessible to authorized entities such as the manufacturer) on a RFID tag using memory partition in connection with multi-frequency coupling. In another example, a single frequency may be implemented for coupling. The present invention generally provides for the memory partition in connection with manufacturer write privilege to prevent unauthorized re-write of secure information in the RFID tag.

In one example the present invention provides for manufacture write and re-write of a the secure portion of memory (i.e., a secure portion of a partitioned memory) on the RFID tag. However, a user can only read the secure portion, while implementing write/read operations on a user portion of the memory.

In another example, a cut-off switch device to permanently disconnect the manufacture-write channel (and, thus, write access to the secure portion of the memory) may be implemented to prevent re-write operations on the secure information (i.e., the secure portion of the memory).

In yet another example, a write only once operation on the secure portion of the memory may be implemented (e.g., the secure portion of the memory may be implemented as programmable read only memory (PROM)).

In the description below, the abbreviations, acronyms, terms, etc. may be defined as follows:

Block: A block is a group of records on a storage device. Blocks are manipulated as units. For example, disk drives often read and write data in 512-byte blocks.

EEPROM: Electrically Erasable Programmable Read-Only Memory. EEPROM is a special type of PROM that can be erased by exposing it to an electrical charge. Like other types of PROM, EEPROM retains its contents even when the power is turned off. Also like other types of ROM, EEPROM is not as fast as RAM. EEPROM is similar to flash memory (sometimes called flash EEPROM). The principal difference is that EEPROM requires data to be written or erased one byte at a time whereas flash memory allows data to be written or erased in blocks. This makes flash memory faster Flash memory: A special type of EEPROM that can be erased and reprogrammed in blocks instead of one byte at a time.

Master: Manufacturer, producer, etc. The entity that produces the product where the RFID tag of the present invention is implemented.

PROM: Programmable Read-Only Memory, a memory chip on which data can be written only once. Once a program has been written onto a PROM, the information remains there forever. Unlike RAM, PROMs retain their contents when the computer is turned off. The difference between a PROM and a ROM (read-only memory) is that a PROM is manufactured as blank memory, whereas a ROM is programmed during the manufacturing process. To write data onto a PROM chip, you need a special device called a PROM programmer or PROM burner. The process of programming a PROM is sometimes called burning the PROM.

RAM: Random Access Memory, a type of computer memory that can be accessed randomly; that is, any byte of memory can be accessed without touching the preceding bytes. RAM is the most common type of memory found in computers and other devices, such as printers. There are two basic types of RAM: dynamic RAM (DRAM) and static RAM (SRAM). The two types differ in the technology they use to hold data, dynamic RAM being the more common type. Dynamic RAM needs to be refreshed thousands of times per second. Static RAM does not need to be refreshed, which makes SRAM faster than DRAM. However, SRAM is also more expensive than dynamic RAM. Both types of RAM are volatile, meaning that they lose their contents when the power is turned off.

RFID: Radio Frequency Identification, a technology similar in theory to bar code identification. With RFID, the electromagnetic or electrostatic coupling in the RF portion of the electromagnetic spectrum is used to transmit signals. An RFID system consists of an antenna and a transceiver, which read the radio frequency and transfer the information to a processing device, and a transponder, or tag, which is an integrated circuit containing the RF circuitry and information to be transmitted. RFID systems can be used just about anywhere, from clothing tags to missiles to pet tags to food—anywhere that a unique identification system is needed. The tag can carry information as simple as a pet owners name and address or the cleaning instruction on a sweater to as complex as instructions on how to assemble a car. Some auto manufacturers use RFID systems to move cars through an assembly line. At each successive stage of production, the RFID tag tells the computers what the next step of automated assembly is. One of the key differences between RFID and bar code technology is RFID eliminates the need for line-of-sight reading that bar coding depends on. Also, RFID scanning can be done at greater distances than bar code scanning. High frequency RFID systems (850 MHz to 950 MHz and 2.4 GHz to 2.5 GHz) offer transmission ranges of more than 90 feet, although wavelengths in the 2.4 GHz range are absorbed by water (the human body) and therefore has limitations. RFID is also called dedicated short range communication (DSRC).

ROM: Read-Only Memory, computer memory on which data has been prerecorded. Once data has been written onto a ROM chip, the data cannot be removed and can only be read. Unlike RAM, ROM retains its contents even when the power is turned off. ROM is referred to as being nonvolatile, whereas RAM is volatile.

Tank circuit (or tank): A circuit capable of storing electrical energy over a band of frequencies continuously distributed about a single frequency at which the circuit is generally said to be resonant or tuned. The selectivity of the circuit is proportionate to the ratio between the energy stored in the circuit and the energy dissipated. This ratio is generally referred to as the Q of the circuit.

User: Customer, client, buyer, end user, ultimate user, etc. of the product where the RFID tag of the present invention is implemented.

Referring to FIG. 1, a diagram of one example of a RFID read/write tag system 100 of the present invention is shown. The system 100 is generally implemented in connection with an information storage system (e.g., a tape library system and the like). However, the system 100 may be implemented in connection with any RFID implementation where security of a portion of information stored on the RFID tag is desired. The system 100 generally comprises system having a separate manufacturer-write channel with multi-frequency coupling.

The system 100 generally comprises a write-active (e.g., write/read) mechanism (e.g., subsystem, device, apparatus, controllers and couplers, etc.) 102 and a memory 104. In one example, the memory 104 may be implemented as an EEPROM.

The write/read subsystem 102 generally comprises a coupler/controller (or controller/coupler) 110a and a coupler/controller (or controller/coupler) 10b. The coupler/controller 110a generally comprises a user related coupler/controller (i.e., the coupler/controller 110a generally performs write and read operations corresponding to user data or information that is stored on and retrieved from the RFID system 100). The coupler/controller 110b generally comprises a master (or manufacturer) related coupler/controller (i.e., the coupler/controller 110b generally performs write and read operations corresponding to manufacturer data or information that is presented to, stored on, and retrieved from the RFID tag system 100). The controller/coupler 110 generally comprises a channel.

The coupler/controller 110a generally wirelessly receives an input signal (e.g., DI_U) and transmits (i.e., sends, presents, broadcasts, etc.) a user output signal (e.g., DO_U) and a master output signal (e.g., DO_M). The signals DI_U and DO_U generally contain user related data (information) that is sent to, stored on, and retrieved from the RFID 100. The user coupler/controller 110a generally presents the signal DI_U to the memory 104, and receives the signals DO_U and DO_M from the memory 104 via an output/input 120a.

The coupler/controller 110b generally wirelessly receives an input signal (e.g., DI_M) and transmits (i.e., sends, presents, broadcasts, etc.) the output signals DO_U and DO_M. The signals DI_M and DO_M generally contain master (manufacturer) related data (information) that is sent to, stored on, and retrieved from the RFID 100. The master coupler/controller 110b generally presents the signal DI_M to the memory 104, and receives the signals DO_U and DO_M from the memory 104 via an output/input 120b.

The coupler/controller (or channel) 110 generally comprises a channel controller 130, a coupler 132, and an antenna 134. The channel controller 130, the coupler 132, and the antenna 134 are generally electrically coupled to form a channel. The channel controllers 130a and 130b generally receive and present the signals DI_M and DO_M, and DI_U and DO_U, respectively, in response to commands (control signals, not shown) that are presented as appropriate to control operations of the RFID tag system 100 (e.g., write, read, store/retrieve manufacturer data, store/retrieve user data, and the like).

The couplers 132a and 132b are generally configured to couple the respective controllers 130a and 130b at unique frequencies (i.e., frequencies that are different from each other). The antennas 134a and 134b generally wirelessly receive and present the signals DI_M and DO_M, and DI_U and DO_U, respectively.

The two controllers 130 are generally electrically coupled to the respective RF couplers 132 independently to form separate channels (e.g., a user channel 110a and a master channel 110b). The coupler 132a of the user channel is generally implemented as a RFID tag coupler. The coupler 132b of the master channel may be implemented as a coupler that responds in connection with a frequency that is generally different from the user channel frequency. As such, the master channel coupler 132b is generally be turned on by the master channel controller 130b and not the user channel controller 130a. In one example, the master-write channel may use a narrow response bandwidth circuit and tune (e.g., turns on and off) the RFID read/write subsystem 110b at the respective manufacture facility. Therefore, re-write on the master channel by users is generally prevented.

The coupling circuits 132a and 132b on the tag 100 may be separate tanks that are tuned on two frequencies, respectively. The signals DI_U and DO_U may be communicated (i.e., transmitted and received) via a user frequency, and signals DI_M and DO_M may be communicated (i.e., transmitted and received) via a master frequency that is different from the user frequency. In one example implementation, the user channel may be tuned at 13 MHz. and the master channel may be tuned another at a different frequency such as 144 MHz.

The memory 104 may have an input 140a that may receive the signal DI_U from the controller/coupler 110a, an input 140b that may receive the signal DI_M from the controller/coupler 110b, an output 142a that may present the signal DO_U to the user controller/coupler 110a and to the master coupler/controller 110b, and an output 142b that may present the signal DO_M to the user controller/coupler 110a and to the master coupler/controller 110b. The signals DO_U and DO_M may be transmitted via a bus 144.

The memory 104 generally comprises a memory portion (e.g., region, area, section, segment, block or group of blocks, etc.) 150, and a memory portion 152. The portion 150 may be implemented as user accessible memory and the portion 152 may be implemented as master (or manufacturer) accessible memory. The portion 150 may receive and store (i.e., contain, hold, etc.) the signal DI_U, and present the signal DO_U. The portion 152 may receive and store the signal DI_M, and present the signal DO_M.

In one example, the information stored in the user portion 150 of the memory 104 (i.e., the information contained in the signal DI_U) may be retrieved via the output 142a by the user controller 130a and wirelessly transmitted using the user channel coupler/controller 110a as the signal DO_U. In another example, the information stored in the master portion 152 of the memory 104 (i.e., the information contained in the signal DI_M) may be retrieved via the output 142b by the user controller 130a and wirelessly transmitted using the user coupler/controller 110a as the signal DO_M.

In yet another example, the information stored in the user portion 150 of the memory 104 (i.e., the information contained in the signal DI_U) may be retrieved via the output 142b by the master controller 130b and wirelessly transmitted using the master coupler/controller 110b as the signal DO_U. In a further example, the information stored in the master portion 152 of the memory 104 (i.e., the information contained in the signal DI_M) may be retrieved via the output 142b by the master controller 130b and wirelessly transmitted using the master coupler/controller 110b as the signal DO_M.

In one example, the user memory 150 may be implemented as EEPROM that is accessible by the user, and the master memory 152 may be implemented as a memory that is only accessible by the master (e.g., manufacturer or other authorized entity). The memory 152 is generally not write accessible by the user (i.e., the master portion 152 of the memory 104 is unalterable by the user).

As discussed above, in one example, the accessibility of the memory 152 may be controlled via predetermining (preselecting) the frequency response of the user channel 110a as different from the master channel 110b. As such, the data input channels related to the respective input signals DI_U and DI_M are generally isolated from each other. The data output channels related to the respective output signals DO_U and DO_M may be linked together (e.g., via the bus 144). However, the data output channels related to the respective output signals DO_U and DO_M may be isolated (not shown).

Figure 2:
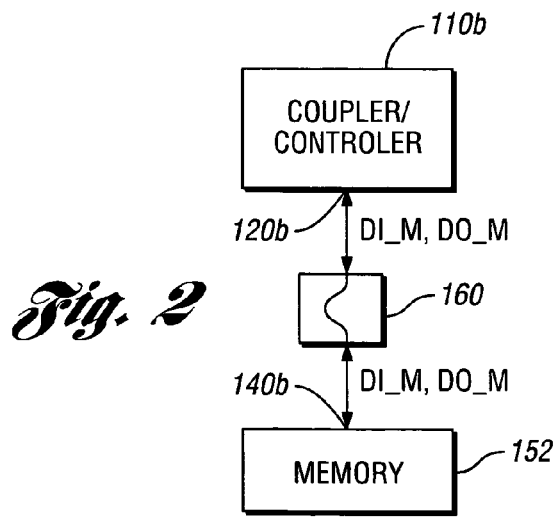
FIG. 2 is a diagram of an alternative signal path for the RFID tag system of the present invention.

Referring to FIG. 2, a diagram illustrating an alternative for the electrical coupling between the master coupler/controller circuit 110b and the master memory portion 152 is shown. To control write access (or operations) to the master portion of memory 152, a cut-off device (e.g., switch) 160 may be electrically serially coupled on the manufacture-write channel between the output 120b and the input 140b.

The device 160 may have a first terminal that is connected to the output 120b and a second terminal that is connected to the input 140b. The device 160 may be implemented as an interruptible device. The device 160 may be a device that can be modified (e.g., switched, disconnected, opened, blown, by-passed, etc.) such that an open circuit is generated between the master coupler/controller circuit 110b and the master memory portion 152.

In one example, the device 160 may be implemented as an electrical over-threshold sensitive device, such as an blow-link fuse. The threshold (e.g., over voltage value, over current value, and the like) for the device 160 may be set (i.e., predetermined, selected, chosen, etc.) such that the manufacture may write/read repeatedly. However, the fuse 160 may be blown to stop further re-write on the secure memory portion 152 when a loading operation of the tag 100 is completed (e.g., when no further data DI_M is to be stored). In another example, the device 160 may be a laser blown link, and the link 160 may be blown (e.g., using a laser) to stop further re-write on the secure memory portion 152 when loading the tag 100 is completed. The path for presenting the master signal DI_M from the coupler/controller subsystem 110b to the master portion 152 of the memory 104 comprises the interruptible device 160, and write operations to the master portion 152 of the memory 104 are disabled when the interruptible device 160 is opened.

Implementation of the device 160 generally provides the manufacturer repeated write/read and re-write operations for as many iterations as desired. The electrical coupling of the master channel 110b to the memory 152 for write operations (i.e., the path of the signal DI_M) may be disconnected after the fuse 160 is blown (e.g., the device 160 is opened). Such an apparatus generally makes the information on the manufacture-write-only portion 152 of the memory 104 read only after the device 160 has opened and the information in the memory 152 is generally unalterable.

Figure 3:
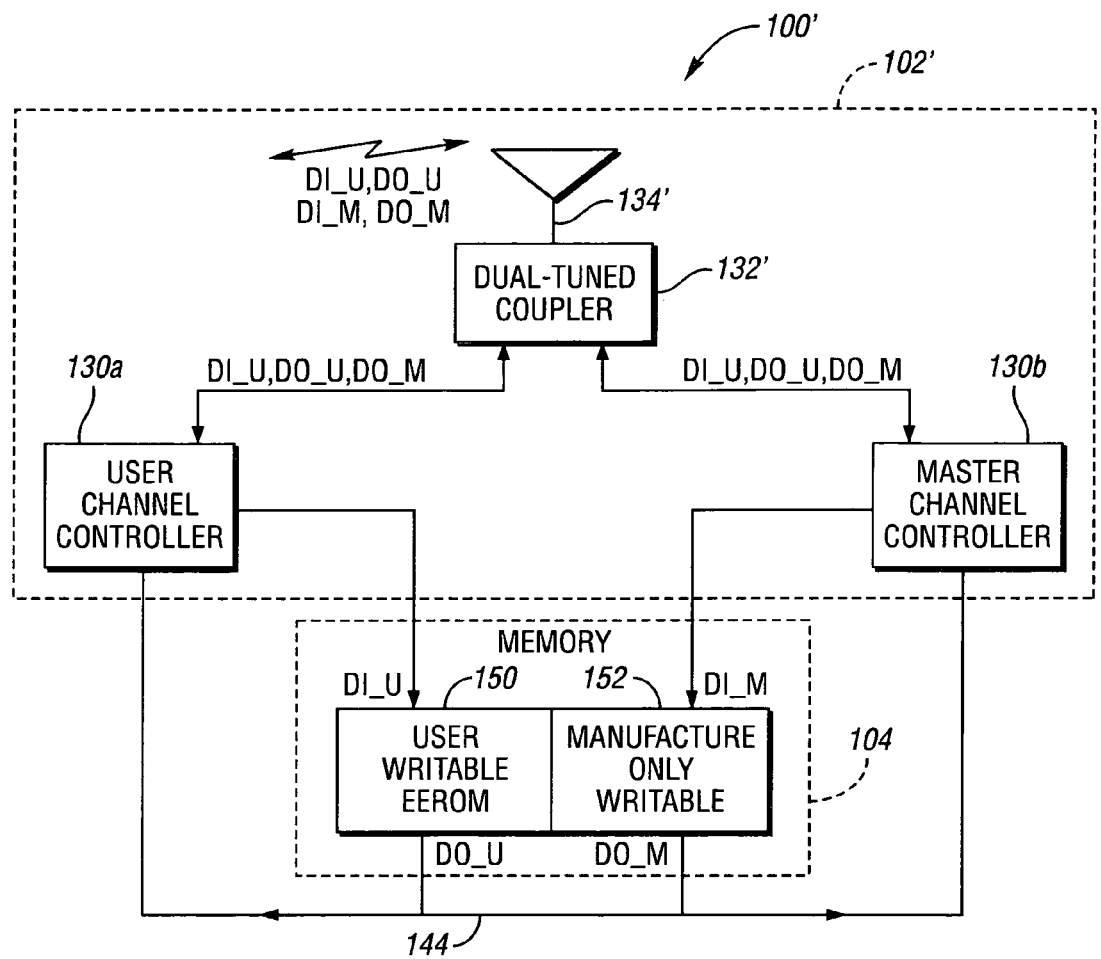
FIG. 3 is a diagram of another example of a RFID tag system of the present invention.

Referring to FIG. 3, a diagram of another example of a RFID tag system 100' of the present invention is shown. The RFID system 100' may be implemented similarly to the system 100. The RFID tag system 100' generally comprises a circuit 102' and the memory 104. The circuit 102' is generally implemented as a coupler/controller.

The circuit 102' generally comprises the controller 130a, the controller 130b, a coupler 132', and an antenna 134'. The coupler 132' may be implemented as a double-tuned electromagnetic tank that is electrically coupled with two high-resolution frequency-filters to both controllers 130a and 130b. The coupler 132' may be implemented to enhance integration of the RFID tag 100' when the manufacturer-controlled frequency (i.e., the master channel frequency) is desired to be closer to the user channel frequency. Such an implementation generally provides a resonance tuning at multiple frequencies to transmit energy and signals (e.g., the signals DI_U, DO_U, DI_M, and DO_M) between the reader/writer (not shown) and the RFID tag 100' of the present invention.

Figure 4:
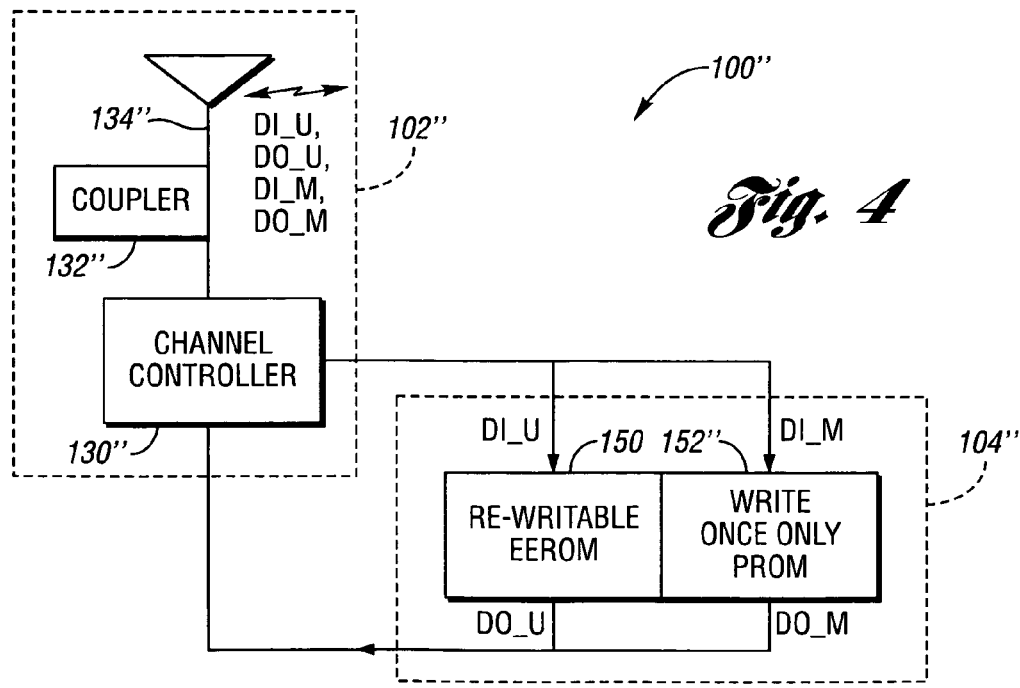
FIG. 4 is a diagram of yet another example of a RFID tag system of the present invention.

Referring to FIG. 4, a diagram of yet another example of a RFID tag system 100" of the present invention is shown. The RFID system 100" may be implemented similarly to the system 100. The RFID tag system 100" generally comprises a circuit 102" and a memory 104".

The circuit 102" is generally implemented as a coupler/controller. The circuit 102" is generally implemented similarly to a channel 110, and generally operates at a single frequency. As such, the coupling circuitry of the RFID tag 100" (e.g., the coupler/controller 102") may be simplified as is implemented in conventional RFID tag approaches.

The memory 104" generally comprises the memory user portion 150 and a master portion 152". The master portion 152" may be implemented as write once PROM. The master memory 152" may provide a secure write on PROM. The master memory 152" may be written only once (e.g., during manufacture). The user of the RFID tag system 100" can generally access the user memory portion 150. However, the user of the RFID tag system 100" can not alter the manufacturer information stored in the PROM 152" (i.e., the information (or coding) entered on the memory 152" is generally secure).

After a loading operation is performed (e.g., after the signal DI_M has been received by the system 100" and written to the memory portion 152") by the RFID tag 100" manufacturer or other authorized entity, the memory portion 152" may be a ROM having secure coding (or information). The memory 104", then, generally comprises the EEPROM 150 which may be accessible by the user and the PROM 152" that can generally only be read when a write operation has been performed.

As is readily apparent from the foregoing description, then, the present invention generally provides an improved method and an improved system for new and innovative techniques for improving the security of radio frequency identification (RFID) tags. The present invention may use low cost IC memories and add a more secure layer that may protect manufacturer information (e.g., provide locked code) on the RFID tag when compared to conventional approaches.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A radio frequency identification (RFID) tag system, the system comprising:
a coupler/controller subsystem that wirelessly receives and transmits at least one user signal and at least one master signal; and
a memory electrically coupled to the coupler/controller subsystem, wherein the memory comprises a user portion for storing information contained in the at least one user signal and a master portion for storing information contained in the at least one master signal, and the master portion of the memory is unalterable by a user wherein the coupler/controller subsystem comprises a coupler having double-tuned electro-magnetic tank that is electrically coupled with two high-resolution frequency-filters, an antenna, a user controller and a master controller, wherein the antenna is electrically coupled to the coupler, the coupler is electrically coupled to the user controller and the master controller, the user controller is tuned to a user frequency that is used to transmit and receive the at least one user signal, the master controller is tuned to a master frequency that is used to transmit and receive the at least one master signal, and the master frequency is different from the user frequency.

2. The system of claim 1 wherein the memory comprises Electrically Erasable Programmable Read-Only Memory (EEPROM).

3. The system of claim 1 wherein a path for presenting the at least one master signal from the coupler/controller subsystem to the master portion of the memory comprises an interruptible device, and write operations to the master portion of the memory are disabled when the interruptible device is opened.

4. The system of claim 3 wherein the interruptible device comprises a blow-link fuse electrical over-threshold sensitive device.

5. The system of claim 3 wherein the interruptible device comprises a laser blown link.

6. The system of claim 1 wherein accessibility of the master portion of the memory is controlled by a manufacturer of the system.

7. The system of claim 1 wherein the user portion of the memory comprises Electrically Erasable Programmable Read-Only Memory (EEPROM), the master portion of the memory comprises Programmable Read-Only Memory (PROM), and the master portion of the memory is unalterable after one write operation is performed.

8. The system of claim 7 wherein the one write operation is performed by a manufacturer of the system.

9. A method for securing at least a portion of data on a radio frequency identification (RFID) tag, the method comprising:

wirelessly receiving and transmitting at least one user signal and at least one master signal using a coupler/controller subsystem; and storing information contained in the at least one user signal in a user portion of a memory that is electrically coupled to the coupler/controller subsystem, and storing information contained the at least one master signal in a master portion of the memory, wherein the master portion of the memory is unalterable by a user wherein the coupler/controller subsystem comprises a user controller, a user coupler, and a user antenna that are electrically coupled and tuned to a user frequency that is used to wirelessly transmit and receive the at least one user signal and wirelessly transmit the at least one master signal, and a master controller, a master coupler, and a master antenna that are electrically coupled and tuned to a master frequency that is used to wirelessly transmit and receive the at least one master signal and wirelessly transmit the at least one user signal, and the master frequency is different from the user frequency.

10. The method of claim 9 wherein the memory comprises Electrically Erasable Programmable Read-Only Memory (EEPROM).

11. The method of claim 9 wherein a path for presenting the master signal from the coupler/controller subsystem to the master portion of the memory comprises an interruptible device, and write operations to the master portion of the memory are disabled when the interruptible device is opened.

12. The method of claim 11 wherein the interruptible device comprises a blow-link fuse electrical over-threshold sensitive device.

13. The method of claim 11 wherein the interruptible device comprises a laser blown link.

14. The method of claim 9 wherein accessibility of the master portion of the memory is controlled by a manufacturer of the system.

15. The method of claim 9 wherein the user portion of the memory comprises Electrically Erasable Programmable Read-Only Memory (EEPROM), the master portion of the memory comprises Programmable Read-Only Memory (PROM), and the master portion of the memory is unalterable after one write operation is performed, and the one write operation is performed by an authorized entity.

16. A radio frequency identification (RFID) tag system, the system comprising:

a coupler/controller subsystem that wirelessly receives and transmits at least one user signal and at least one master signal, wherein the coupler/controller subsystem comprises a user controller, a user coupler, and a user antenna that are electrically coupled and tuned to a user frequency that is used to wirelessly transmit and receive the at least one user signal and wirelessly transmit the at least one master signal, and a master controller, a master coupler, and a master antenna that are electrically coupled and tuned to a master frequency that is used to wirelessly transmit and receive the at least one master signal and wirelessly transmit the at least one user signal, and the master frequency is different from the user frequency; and a memory electrically coupled to the coupler/controller subsystem, wherein the memory comprises a user portion for storing information contained in the at least one user signal and a master portion for storing information contained in the at least one master signal, and the master portion of the memory is unalterable by a user.

* * * * *

UNITED STATES PATENT AND TRADEMARK OFFICE
CERTIFICATE OF CORRECTION

| | |
|---|---|
| PATENT NO. | : 7,316,352 B1 |
| APPLICATION NO. | : 11/021216 |
| DATED | : January 8, 2008 |
| INVENTOR(S) | : William Carl Dodt et al. |

It is certified that error appears in the above-identified patent and that said Letters Patent is hereby corrected as shown below:

Column 9, Line 32, Claim 9:

After "information contained" insert -- in --.

Signed and Sealed this

Twenty-seventh Day of May, 2008

JON W. DUDAS
*Director of the United States Patent and Trademark Office*